(12) United States Patent
Wu

(10) Patent No.: US 7,899,061 B2
(45) Date of Patent: Mar. 1, 2011

(54) ACCESS DEVICE AND SERVICE TRANSMISSION METHOD

(75) Inventor: Haijun Wu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 606 days.

(21) Appl. No.: 11/629,669

(22) PCT Filed: Apr. 30, 2006

(86) PCT No.: PCT/CN2006/000885
§ 371 (c)(1),
(2), (4) Date: May 8, 2007

(87) PCT Pub. No.: WO2006/116947
PCT Pub. Date: Nov. 9, 2006

(65) Prior Publication Data
US 2007/0291764 A1    Dec. 20, 2007

(30) Foreign Application Priority Data
Apr. 30, 2005    (CN) ........................ 2005 1 0069843

(51) Int. Cl.
*H04L 12/28*    (2006.01)
*H04L 12/56*    (2006.01)
(52) U.S. Cl. ..................... 370/395.5; 370/401
(58) Field of Classification Search ............ None
See application file for complete search history.

(56) References Cited

U.S. PATENT DOCUMENTS 6,765,918 B1    7/2004    Dixon et al.

(Continued)

FOREIGN PATENT DOCUMENTS

CN    1237846    12/1999

(Continued)

OTHER PUBLICATIONS

Marc Lasserre Vach Kompella (Editors): "Virtual Private LAN Services over MPLS"; IETF Standard-Working -Draft, Internet Engineering Task Force IETF CH, vol. 12VPM, No. 4 Aug. 2004.

(Continued)

*Primary Examiner*—Chirag G Shah
*Assistant Examiner*—Suk Jin Kang
(74) *Attorney, Agent, or Firm*—Finnegan, Henderson, Farabow, Garrett & Dunner LLP

(57) ABSTRACT

An access device includes a Multi-protocol Label Switching (MPLS) connection management functional module for establishing a label connection and using the label connection for service transmission. The present invention also discloses a service transmission method, including establishing, in the access device, an external connection with the network side, and getting the received service mapped by the access device to the external label for transmission. A high bandwidth of the access device is ensured by utilizing a simple label switching principal in the MPLS protocol according to this invention; meanwhile, it is possible for the access device to support the access of multiple services, such as those of a Time Division Multiplexing (TDM), an Asynchronous Transfer Mode (ATM), a Fast Ethernet (FE) and an Asymmetric Digital Subscriber Line (ADSL), by utilizing the good service adaptability of the MPLS protocol to effectively increase the utilization rate of the network.

14 Claims, 12 Drawing Sheets

U.S. PATENT DOCUMENTS

| | | | |
|---|---|---|---|
| 6,839,320 B2* | 1/2005 | Paridaens et al. | 370/230 |
| 7,394,820 B1* | 7/2008 | Dianda | 370/401 |
| 2002/0097730 A1* | 7/2002 | Langille et al. | 370/401 |
| 2002/0181457 A1* | 12/2002 | Mezeul et al. | 370/389 |
| 2003/0112760 A1* | 6/2003 | Puppa et al. | 370/241.1 |
| 2003/0118026 A1* | 6/2003 | Kuhl et al. | 370/395.21 |
| 2003/0128688 A1* | 7/2003 | Kim | 370/351 |
| 2004/0100968 A1* | 5/2004 | Kim | 370/395.5 |
| 2004/0133700 A1* | 7/2004 | De Clercq et al. | 709/242 |
| 2004/0160958 A1* | 8/2004 | Oh | 370/395.1 |
| 2004/0165601 A1* | 8/2004 | Liu et al. | 370/401 |
| 2004/0213292 A1 | 10/2004 | Willhite et al. | |
| 2004/0249960 A1* | 12/2004 | Hardy et al. | 709/229 |
| 2005/0132061 A1* | 6/2005 | T'Joens et al. | 709/227 |
| 2005/0220143 A1* | 10/2005 | DelRegno et al. | 370/471 |
| 2007/0091911 A1* | 4/2007 | Watanabe et al. | 370/408 |
| 2008/0069110 A1* | 3/2008 | Rijsman | 370/395.5 |

FOREIGN PATENT DOCUMENTS

| | | |
|---|---|---|
| EP | 1542425 | 6/2005 |
| WO | WO02/078253 | 10/2002 |

OTHER PUBLICATIONS

Marc Lasserre, et al; "Virtual Private LAN Services over MPLS:" Internet Draft Document, Provider Provisioned VPN Working Group, draft-ietf-l2vpn-vpla-1dp-05.txt, Sep. 2004.

* cited by examiner

ACCESS DEVICE AND SERVICE TRANSMISSION METHOD

CLAIM OF PRIORITY

This application is a U.S. national phase application under 35 U.S.C. §371 of International Patent Application No. PCT/CN2006/000885 filed Apr. 30, 2006, and claims the benefit of priority of CN patent application Ser. No. 2005 10069443.8 filed Apr. 30, 2005, the disclosures of all of which are hereby incorporated by reference in their entireties. The International Application was published in Chinese on Nov. 9, 2006 as WO 2006/116947.

FIELD OF THE TECHNOLOGY

The present invention relates to the field of communication technologies, particularly to an access device and a service transmission method.

BACKGROUND OF THE INVENTION

At present, Digital Subscriber Line Access Multiplexer (DSLAM) broadband access devices principally include an Asynchronous Transfer Mode DSLAM (ATM DSLAM) which is a broadband access device based on ATM switch and an Internet Protocol DSLAM (IP DSLAM) which is a broadband access device based on Virtual Local Area Network (VLAN)+Medium Access Control (MAC) switch.

Existing broadband access devices may, according to the device's form, be divided into two kinds: frame type and box type. As shown in FIG. 1, both kinds of the broadband access devices include four components: a subscriber interface functional module, a main control functional module, a switching functional module and a backplane connection functional module. Where, the subscriber interface functional module is used for providing access interfaces for subscribers, and different subscriber interface functional modules provide different access modes, including any or any combination of an Asymmetric Digital Subscriber Line (ADSL), a Very High Data Rate Digital Subscriber Line (VDSL), an Ethernet and a Symmetric High Data Rate Digital Subscriber Line (G.SHDSL), etc. In general, a broadband access device may provide a plurality of subscriber interface functional modules and each subscriber interface functional module may provide a plurality of line interfaces for the user to access. The main control functional module is used for providing the broadband access device with a system control and management function; the switching functional module is used for providing the whole broadband access device with service converging and processing function as well as a network side interface, and the backplane connection functional module is used for providing a connection and communication function between aforesaid functional modules.

The DSLAM broadband access device has seen development through such phases as those of a narrow band Time Division Multiplexing (TDM) switching kernel, an ATM switching kernel, an Ethernet switching/IP switching kernel, etc.

Another existing broadband access device is based on the Ethernet/IP switching kernel, which may, by using a network architecture of Ethernet Layer 2 (L2)/Layer 3 (L3) based switching, provide a higher switching capacity up to 10 Gbps-48 Gbps or even higher and an interface bandwidth based on a Fast Ethernet (FE)/Gigabit Ethernet (GE), even 10 GE, such that a bandwidth bottleneck is conquered. An Ethernet message bearer is used between the subscriber interface functional module and the main control switching functional module of the access device, a FE or a GE connection is used between the subscriber interface functional module and the main control functional module, and the switching sub-functional module is also based on the Ethernet switching.

As shown in FIG. 3, a service processing of the broadband access device based on the Ethernet/IP switching kernel is as follows: an ATM Virtual Channel (VC) bearer or an Ethernet message mode is used by the subscriber interface functional module to get service accessed, then an ATM cell is regrouped and converted back to an Ethernet message with a 802.1Q based VLAN ID added, and is transferred to the switching functional module via the Ethernet based FE/GE star bus on the backplane connection functional module, then the switching functional module forwards the service to corresponding output port through the VLAN+MAC address based learning and switching mode or through the L3 IP address based mode.

SUMMARY OF THE INVENTION

An access device and a service transmission method are provided.

An access device, including:
a subscriber interface functional module;
a main control switching functional module; and
a Multi-Protocol Label Switching (MPLS) connection management functional module for establishing a label connection needed for a service transmission of the access device and for using, controlling and releasing the label connection during the service transmission.

It can be seen from the above technical solution according to this invention that an MPLS connection management functional module for establishing a label connection and transferring service using the label connection is configured in the access device, so that a high bandwidth of the access device can be ensured by using a simple label switching principle in the MPLS protocol; meanwhile, it is possible for the access device to support the access of multiple services, such as the TDM, the ATM, the FE and the ADSL, using a good service adaptability of the MPLS protocol, and in the future it is still possible to implement such Virtual Private Network (VPN) services as a Virtual Leased Line (VLL), a Virtual Private Local Area Network (LAN) segment (VPLS), a Virtual Router (VR), etc. using the MPLS protocol so as to effectively increase utilization rate of the network. Moreover, in this invention, service and MPLS connection established can be sensed at the point of an edge access device, which makes the operation of the whole network less complicated and the fine management in the whole network possible.

EMBODIMENTS OF THE INVENTION

Figure 2:
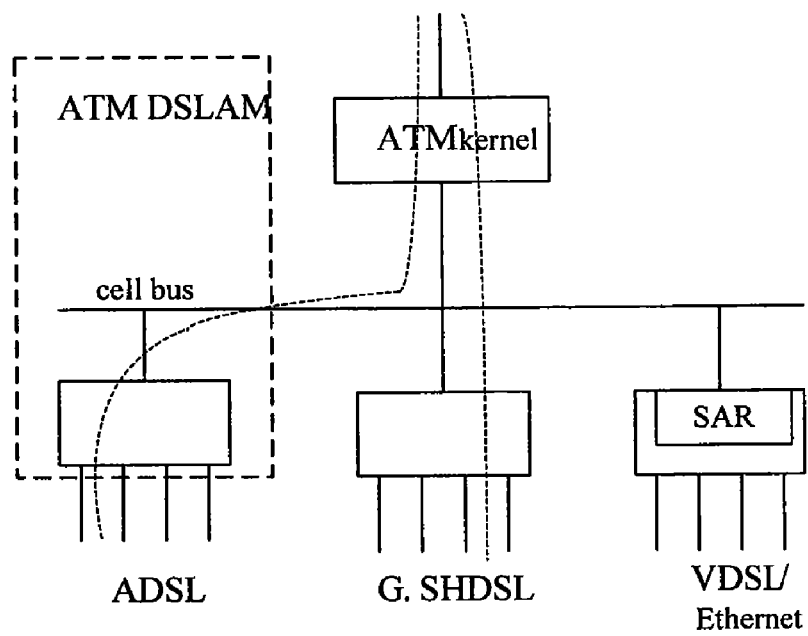
FIG. 2 is a schematic illustrating the service processing of an ATM kernel based broadband access device.
Figure 3:
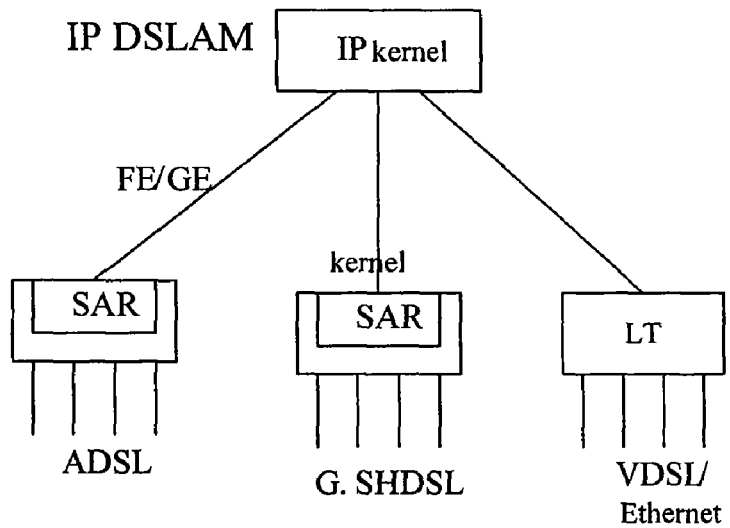
FIG. 3 is a schematic illustrating the service processing of an Ethernet/IP kernel based broadband access device.

The broadband access device based on the ATM switching kernel is a mainstream access device type presently used in the broadband access network. As shown in FIG. 2, the broadband access device based on the ATM switching kernel adopts an ATM bearer from the subscriber interface functional module to the main control switching functional module, adopts a shared cell bus or an ATM bus interface, and the switching sub-functional module also switches based on the ATM cell. However, at present, the mainstream application of ATM interface bandwidth remains at a Synchronous Transmission Mode (STM)-1 (155Mbps) because the ATM technology is no longer developed, and there is almost no commercial use of STM-4 (622Mbps) bandwidth capacity and STM-16 (2.5Gbps) interface bandwidth due to a high cost of the interface. Along with the development of network multiple services, the demand for network bandwidth is increasing, and the performance of ATM switching network can no longer meet the demands for high bandwidth; in addition, it is impossible for the broadband access device based on the ATM switching kernel to effectively sense the present mainstream business — multiple services using the IP bearer, and it is impossible to effectively ensure the multiple services' Quality of Service (QoS); since the ATM technology is a technique for a point to point connection, which is unable to provide effective networking for the mainstream application of a point to multipoint IP Television (IPTV) multicast service, it is impossible for the ATM technique to support the development of the IPTV.

As the switching functional module in the broadband access device based on the Ethernet/IP switching kernel performs the switching by using the VLAN+MAC. it is necessary for the L2 converging network to support a large quantity of MAC+VLAN address list items when a large number of users are accessing; in particular, after a network of multiple services is put into practice, there are a plurality of service terminals with multiple MAC addresses for each user, which increases the load of the converging network and may make the networking unable to realize. In addition, the Ethernet/IP switching kernel based broadband access device only has good compatibility and adaptability to the IP based service such that the existing network services like the TDM or the ATM access service supported by the traditional ATM DSLAM access device are not compatible in the Ethernet/IP switching kernel based broadband access device. Moreover, the Ethernet/IP switching kernel based broadband access device has limited QoS capacity so that a priority differentiation can only be achieved on the basis of a coarse granularity flow instead of fine management, which makes the access device not expansible in the future oriented fine service administration and configuration.

Figure 4:
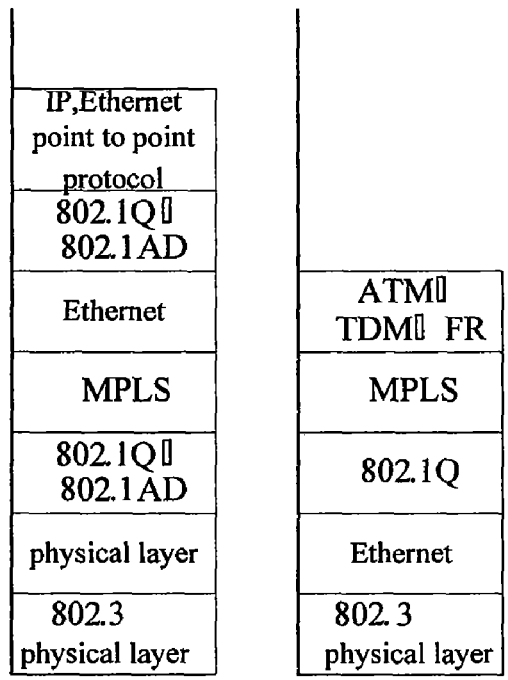
FIG. 4 is a schematic illustrating the format of the bearer for various access services based on a Multi-protocol Label Switching (MPLS) protocol.

The MPLS technique is a connection based label switching technique. FIG. 4 is a schematic illustrating the format of the bearer for various access services based on the MPLS protocol. As shown in FIG. 4, the left part shows that, by using the MPLS protocol as a bearer of Ethernet messages, an IP based service is implemented by an integrated service bearer, such as a bearer of data, voice of IP (VoIP) and IP television (IPTV) service, between a broadband access device node and a Broadband Access Server (BAS) or a core network edge router, or implemented by an end-to-end MPLS connection to the peer end, such as an Ethernet Private Line Service (PLS) connection, with the broadband access device spanning the BAS or the core network edge router. The Ethernet based service is loaded on the MPLS protocol following the Ethernet Pseudo Wires Emulation 3 (PWE3) standard defined by the edge to edge PWE3 working team of an Internet Engineering Task Force (IETF), and the right part shows that the traditional ATM, TDM and Frame Relay (FR) service are loaded on the MPLS protocol via the PWE3, crossing the BAS or the core network edge router to form an end to end ATM, TDM and/or FR private line with the peer end without the need of an independent ATM, a Digital Data Network (DDN) and/or an FR network. The ATM/TDM/FR based service is loaded on the MPLS protocol in conformity with the ATM PWE3 standard defined by the IETF PWE3 working team.

The key idea of the embodiments of the present invention is that an MPLS connection management functional module is configured in the access device for establishing a label connection needed for service transmission and for using and controlling the label connection during the service transmission.

Figure 5:
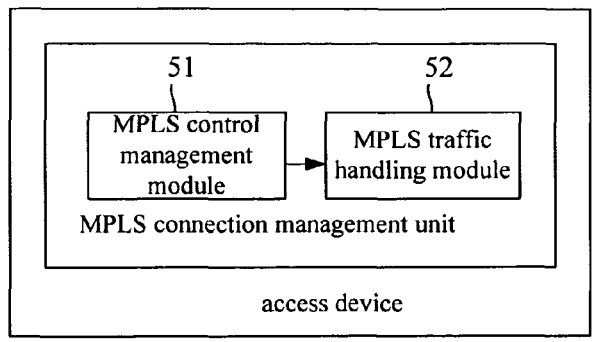
FIG. 5 is a schematic illustrating the structure of the access device provided by an embodiment of the present invention.

FIG. 5 is a schematic illustrating the structure of the access device provided by an embodiment of the present invention; as shown in FIG. 5, the access device includes an MPLS connection management functional module for establishing the label connection needed for the service transmission of the access device and for using and controlling the label connection during the service transmission; and for releasing the occupied label connection when the service transmission is over.

The label connection mentioned here includes a single layer Label Switched Path (LSP) connection, an LSP stack connection, the PWE3 encapsulation information loaded on the corresponding MPLS LSP and configuration and management of such attributes as the bandwidth and the priority associated with the connection.

The MPLS connection management functional module can either be configured in the access device's subscriber interface functional module and/or the main control switching functional module, or be configured independently outside of the subscriber interface functional module and the main control switching functional module, i.e. configured in the access device as an independent functional module.

As shown in FIG. 5, the MPLS connection management functional module mainly includes an MPLS control management module 51 and an MPLS service processing module 52.

The MPLS control management module 51 is used for establishing an internal label connection within the access device and an external label connection between the access device and the network side, sending the established label connection to the MPLS service processing module 52, sending a control instruction for controlling and using the label connection to the MPLS service processing module 52 during the service transmission, and sending another control instruction for releasing the established label connection to the MPLS service processing module 52 when the service transmission is over.

The label connection herein can be established either by a static designation or be established dynamically based on such a specific protocol as a Label Distribution Protocol (LDP) or a Constraint-based Routing Label Distribution Protocol (CR-LDP). The label connection includes the internal label connection within the access device and the external label connection between the access device and the network side.

The MPLS service processing module 52 is used for receiving the label connection sent from the MPLS control management module 51, mapping each service sent from the user terminal to corresponding label connection for transmission, releasing the occupied label connection when the service transmission is over, and de-encapsulating the label connection based service sent from the network side.

Specifically, function of the MPLS service processing module 52 may be jointly implemented by the subscriber interface functional module and the main control switching functional module. For example, the MPLS protocol based internal label encapsulation of the service sent from the user terminal may be performed in the subscriber interface functional module of the access device, then the service is sent to the main control switching functional module, and to the network side after a label switching process of the service is completed by the main control switching functional module. Alternatively, the received service may be directly sent to the main control switching functional module by the subscriber interface functional module, and be sent to the network side after the MPLS protocol based external label encapsulation of the service is performed by the main control switching functional module.

Further, the access device includes a clock system module for providing a reference timing for the whole access system, and the reference timing is output to each clock module in the entire system from the clock module of the main control switching functional module.

The input timing of the clock system module may be a Building Integrated Timing System (BITS) timing or an E1 timing input from the network side, or a timing generated by a self-sustained oscillation of the clock system module.

The access device supporting multiple service transmission according to the embodiment of the present invention is hereinafter described in detail with a frame broadband access device as an example.

The broadband access device provided by the embodiment of the present invention principally includes a Network Switching board (NSB), an access board
(ACB) and a backplane board (BPB).

The interfaces provided and protocols supported by the ACB are as follows:

(1) the ADSL, the ADSL2 and the ADSL2+interface adopting the ATM access protocol;

(2) a Quadrature Amplitude Modulation (QAM) based VDSL and/or discrete multi-tone (DMT) based VDSL and/or VDSL2 interface adopting the Ethernet access protocol;

(3) G.SHDSL interface adopting the ATM access protocol;

(4) FE/GE interface adopting the Ethernet access protocol;

(5) ATM E1/E3/STM-1 interface adopting the ATM access protocol;

(6) such interfaces as the TDM E1 interface adopting the TDM access protocol.

The broadband access device provided according to the embodiment of the invention may use the MPLS protocol based label connection only between the subscriber interface functional module and main control switching functional module for service transmission, or only between the main control switching functional module and the network side for service transmission, and the two cases are hereinafter described with reference to FIGS. 6 and 7, respectively.

Figure 6:
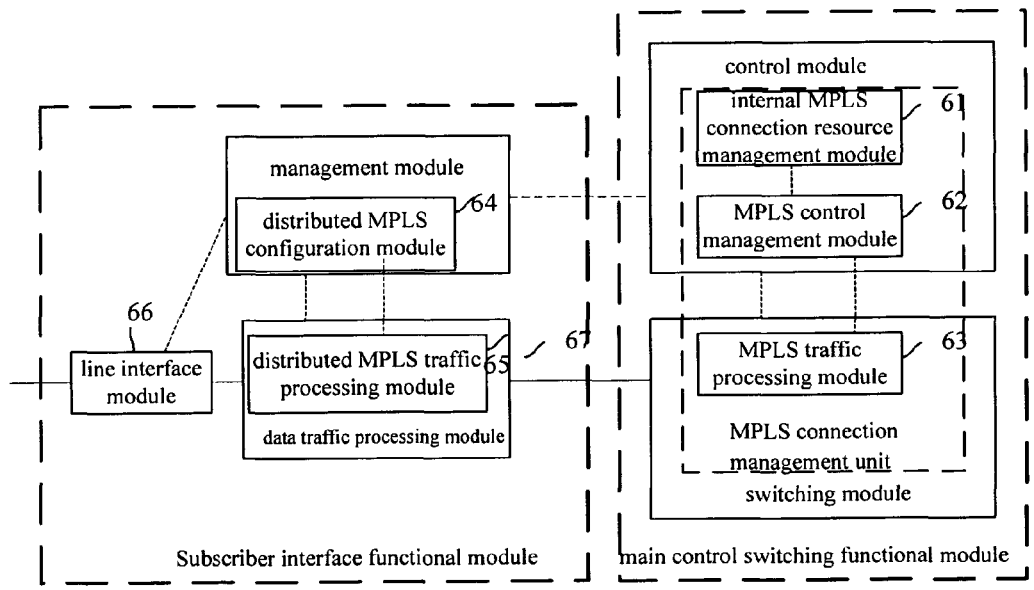
FIG. 6 is Schematic I illustrating the structure of the frame broadband access device in accordance with an embodiment of the present invention.

FIG. 6 is a schematic illustrating the structure of the broadband access device provided according to the embodiment of the invention when the MPLS protocol based label connection is used between the subscriber interface functional module and main control switching functional module for service transmission; as shown in FIG. 6, the MPLS connection management functional module configured in the broadband access device includes an internal MPLS connection resource management module 61, an MPLS control management module 62 and an MPLS service processing module 63.

The internal MPLS connection resource management module 61 is used for managing the connection resources between the subscriber interface functional module and the main control switching functional module, and sending the connection resource information to the MPLS control management module 62, where the internal MPLS connection resource management module 61 may be configured in the control module of the main control switching functional module.

The MPLS control management module 62 is used for establishing the internal label connection between the subscriber interface functional module and the main control switching functional module according to the connection resource information sent from the internal MPLS connection resource management module 61 and for establishing the external label connection between the access device and the network side and sending the established internal and external label connections down to the MPLS service processing module 63, where the MPLS control management module 62 may be configured in the control module of the main control switching functional module.

The MPLS service processing module 63 is used for mapping the service sent from the user terminal to the label connection established by the MPLS control management module 62 for transmission, performing a label switching process for the service during service transmission, sending the service after the label switching process to the network side, and de-encapsulating the label connection based service sent from the network side.

The principal functional module of the MPLS service processing module 63 is configured in the main control switching functional module, other functional modules are configured distributedly in the subscriber interface functional module, and the distributed MPLS service processing module 65 configured in the subscriber interface functional module is connected with the distributed MPLS configuration module 64 configured in the subscriber interface functional module.

The distributed MPLS configuration module 64 is used for sending the internal label connection established by the MPLS control management module 62 down to distributed MPLS service processing module 65 in the subscriber interface functional module; and the distributed MPLS configuration module 64 is located in the management module of the subscriber interface functional module.

The distributed MPLS service processing module 65 is used for mapping the service sent from the user terminal to the internal label connection sent from the distributed MPLS configuration module 64 for transmission, and de-encapsulating the label connection based service sent from the main switching functional module before sending the service to the user terminal, and the distributed MPLS service processing module 65 is located in the data service processing module of the subscriber interface functional module.

Further, as shown in FIG. 6, the broadband access device provided according to the embodiment of the invention includes a line interface module 66 and a data service processing module 67. The line interface module 66 is for matching the service sent from other interfaces to the interface of the subscriber interface functional module, and sending the matched service to the data service processing module 67; and the data service processing module 67 is used for adapting the service sent from the line interface module 66 from the non MPLS protocol bearer system to the MPLS protocol bearer system, and sending the adapted service to the main control switching functional module.

The line interface module 66 and the data service processing module 67 are located in the subscriber interface functional module.

The main control switching functional module principally includes a control module to which the main control part is corresponding and a switching module to which the switching system is corresponding, where the control module is used for the management of the whole system and the configuration and management of the label switching list in the switching module, the management and allocation of the MPLS LSP connections, and the PWE3 protocol management; and the switching module is used for the label switching/converging and forwarding for the service according to the configuration and management information of the control module.

As the switching is performed by the switching module according to the MPLS label connection in a fix-length label switching mode, it is possible to provide a high speed switching capacity. The uplink next node (NNI) interface of the main switching functional module may be an ATM interface, or a FE/GE/10 GE/2.5 G packet over synchronous digital hierarchy (POS) interface, etc.

Figure 7:
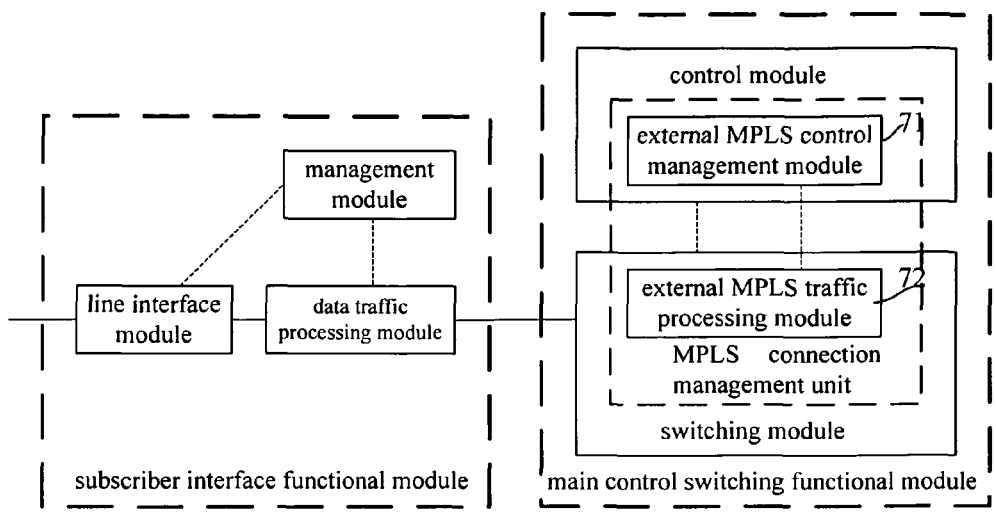
FIG. 7 is Schematic II illustrating the structure of the frame broadband access device in accordance with another embodiment of the present invention.

FIG. 7 is a schematic illustrating the structure of the broadband access device provided according to an embodiment of the invention when the MPLS protocol based label connection is used only between the main switching functional module of the broadband access device and the network side for service transmission, while such traditional mode as an ATM, a TDM mode, etc is used between the subscriber interface functional module and main control switching functional module for service transmission. As shown in FIG. 7, the MPLS connection management functional module built in the broadband access device principally includes an external MPLS control management module 71 and an external MPLS service processing module 72.

The external MPLS control management module 71 is used for establishing the external label connection between the main control switching functional module and the network side, sending the control instruction for using and controlling the established label connection to the external MPLS service processing module 72 when the service is sent by the main control switching functional module to the network side, and sending the control instruction for releasing the established label connection to the external MPLS service processing mode 72 when the service transmission is over.

The external MPLS service processing module 72 is used for receiving the label connection sent from the external MPLS control management module 71, mapping the service sent to the network side to the label connection for transmission according to the control instruction sent from the external MPLS control management module 71, and releasing the occupied label connection when the service transmission is over, and also de-encapsulating the label connection based service sent from the network side.

In the broadband access device provided according to the embodiment of the invention, a control channel as shown by the dot line and a data channel as shown by the solid line in FIGS. 6 and 7 are configured between the subscriber interface functional module and the main control switching functional module, for realizing the management and control of the service transmitted in the subscriber interface module by the control module in the main control switching functional module and for realizing the service data interaction between the main control switching functional module and the subscriber interface functional module. Both the control and data channels are logic channels which may be one physical channel, such as a FE/GE/10 GE channel, or be different physical channels, e.g. a FE/GE/10 GEbps channel is adopted as the data channel whereas an independent master slave serial port or a High Data Link Control (HDLC) link is adopted as the control channel.

Figure 8:
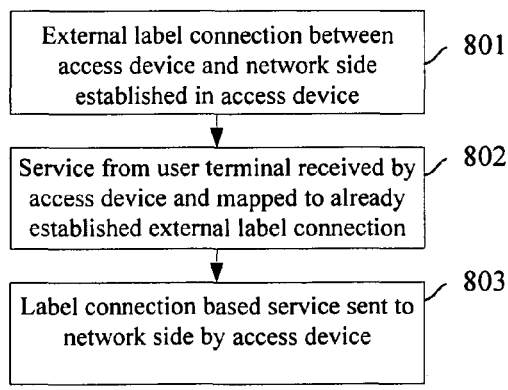
FIG. 8 is a flowchart illustrating the service transmission method provided by an embodiment of the present invention.

A service transmission method used in the access device is also provided by an embodiment of the present invention, and the detailed process for implementing the method as shown in FIG. 8, is as follows:

Step 801: the external label connection between the access device and the network side is established in the access device;

Step 802: the service sent from the user terminal is, after received by the access device, mapped to the established external label connection.

In detail, if the access device is a broadband access device and the MPLS protocol based label connection is used in the access device between the subscriber interface functional module and the main control switching functional module for service transmission, after the service sent from the user terminal is received by the subscriber interface functional module, a corresponding label connection is chosen for the service in the uplink label connection table saved in the subscriber interface functional module according to the service bearer information or/and service type, and the service is mapped to the selected label connection and sent to the main control switching functional module with the label in the label connection's outmost layer being the internal label of the access device. Then, a corresponding label is searched by the main control switching functional module in the outmost layer label stored in itself according to the service bearer information received from the subscriber interface functional module, a switching process for the outmost layer label of the service is performed according to the label searched out, and then the service is sent to the network side. The outmost layer label after switching is the external label between the access device and the network side.

If the access device is a broadband access device and the MPLS based label connection is used only between the access device's main control switching functional module and the network side for transmission, the service sent from the user terminal is directly sent to the main control switching functional module; a corresponding label connection is chosen for the service by the main control switching functional module in the uplink label connection table stored in itself according to the service bearer information and/or service type, and the service is mapped to the selected label connection and then sent to the network side.

Step 803: the label connection based service is sent to the network side by the access device.

Further, if the access device is a broadband access device, after the service sent from the network side is received by the main control switching functional module, an MPLS protocol based de-encapsulation of the service is performed and the service, after de-encapsulated, is sent to the subscriber interface functional module; alternatively, after the service sent from the network side is received by the main control switching functional module, the outmost layer label switching of the service is performed, and then the service is sent to the subscriber interface functional module. After the service is received by the subscriber interface functional module, an MPLS protocol based de-encapsulation of the service is performed, and after de-encapsulated, the service is sent to the user terminal.

For better understanding the embodiments of the present invention, supposing that the uplink interface is an Ethernet GE/FE interface and the user terminal access interface is ADSL2+/ethernet FE/E1 interface, then the service transmission process in the broadband access device as provided according to an embodiment of the present invention can be described as follows.

Figure 9:
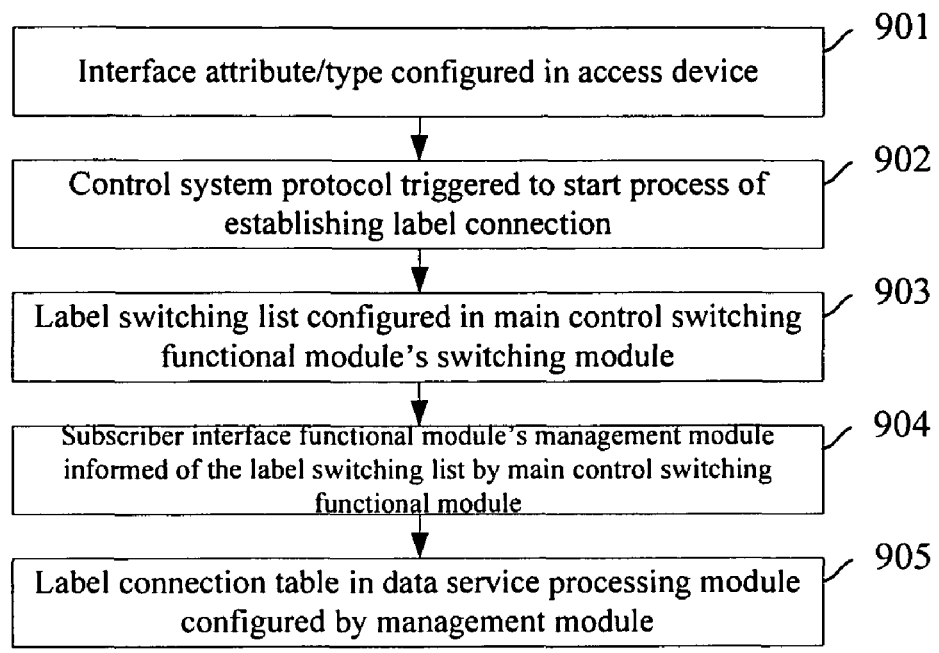
FIG. 9 is a schematic illustrating the process of configuring a label connection table in the broadband access device in accordance with an embodiment of the present invention.

FIG. 9 is a flowchart for configuring the label connection table in the subscriber interface functional module's data service processing module; as shown in FIG. 9, the detailed process is as follows:

Step 901: the interface attribute and interface type are configured in the access device so as to configure corresponding label connection information in the access device.

Aforesaid binding relation is called a Forwarding Equivalence Class (FEC) in the MPLS protocol.

The designated classification rule of the FEC includes but not limited to one of or any combination of the following:

(1) the number of the physical port of the access interface of the access device, such as E1 port number, or the time slot number in E1 etc;

(2) the multiple delay channels of the ADSL port of the access interface of the access device;

(3) the PVC of the access interface of the access device;

(4) the VLAN ID of the access interface of the access device;

(5) the 802.1p of the access interface of the access device;

(6) the 5-element flow classification rule of data service of the access interface of the access device, including a source/destination IP address, a 4-layer source/destination port number, and a protocol type, etc.

Step 902: binding the interface attribute, interface type and remote end device IP address, triggering the control system protocol to initiate the process for establishing a label connection, i.e. the label connection is automatically established according to the control system protocol.

The control system protocol includes the LDP, or the CR-LDP, or the PWE3 control protocol etc; obviously, the label connection from the access device to the remote end device may be manually configured.

Step 903: after the label connection has been established, a corresponding switching list is configured in the switching module of the main control switching functional module.

Step 904: the management module in the subscriber interface functional module is informed of the label switching list by the main control switching functional module via the control channel.

Step 905: the label connection table in the data service processing module is configured by the management module of the subscriber interface functional module according to the received label switching list so as to forward the service on the basis of the label connection table.

Examples with the PVC and the VLAN ID as the FEC are hereinafter taken to describe, respectively, the configuration process of the label connection table and service transmission process of the broadband access device provided according to the embodiment of this invention.

EXAMPLE I

An example with the PVC as the FEC is taken for describing the configuration process of a corresponding label connection table and the service transmission process.

Figure 10:
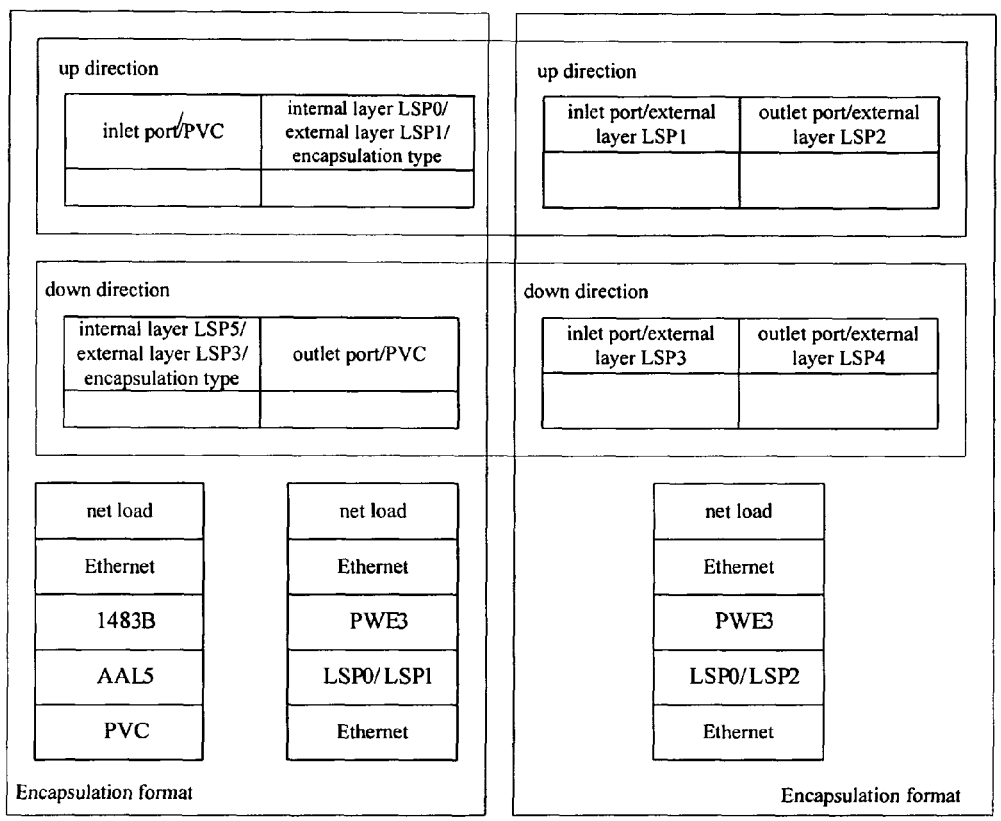
FIG. 10 is a schematic illustrating the label connection table and the format of a transmitted service packet in a subscriber interface functional module during a Permanent Virtual Circuit (PVC) based access.

When the user terminal accesses the access device in a PVC mode, such as an ADSL2+PVC, an ATM port mode, etc, the service message format corresponding to the label connection table in the subscriber interface functional module for transmission is as shown in FIG. 10.

In the uplink direction, the service message is encapsulated with the egress port information and PVC ID information as well as an internal layer label LSP0, an external layer label LSP1 and encapsulation type information in the subscriber interface functional module, and thereafter, sent to the main control switching functional module; in the main control switching functional module, the service message is encapsulated with the ingress port information and corresponding external layer label LSP1 as well as the egress port information and corresponding external label LSP2, and then sent to the network side;

In the downlink direction, the label switching is carried out for the message encapsulated with the ingress port information and corresponding external layer label LSP3 as well as egress port information and corresponding external layer label LSP4, i.e. the message is encapsulated with internal layer label LSP5, external layer label LSP3 and encapsulation type information as well as corresponding egress port information and PVC ID information, and then sent to the subscriber interface functional module. After the message is received by the subscriber interface functional module, the message is de-encapsulated and then sent to the subscriber interface terminal.

In the uplink direction and downlink direction, the protocol stack correspondingly used by each message is as shown in FIG. 10.

In the subscriber interface functional module, if it is necessary to regroup the message into an Ethernet message, using the encapsulation format defined in the IETF Ethernet PWE3 standard; if the message is sent directly in the ATM mode, using an encapsulation format defined in the IETP ATM PWE3 standard, such as the Protocol Data Unit (PDU) mode, Service Data Unit (SDU) mode, etc.

Figure 1:
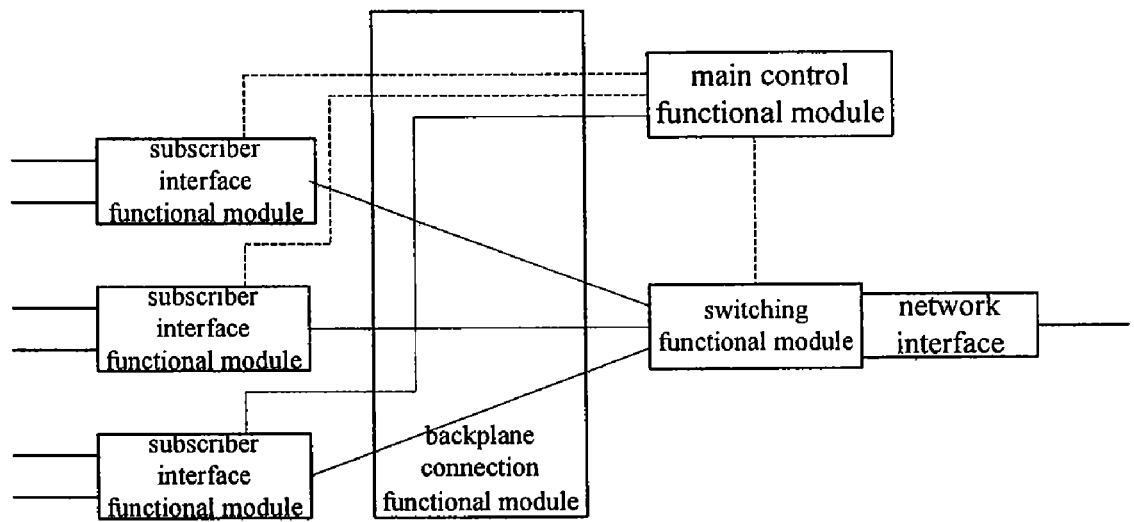
FIG. 1 is a schematic illustrating the structure of an existing broadband access device.
Figure 11:
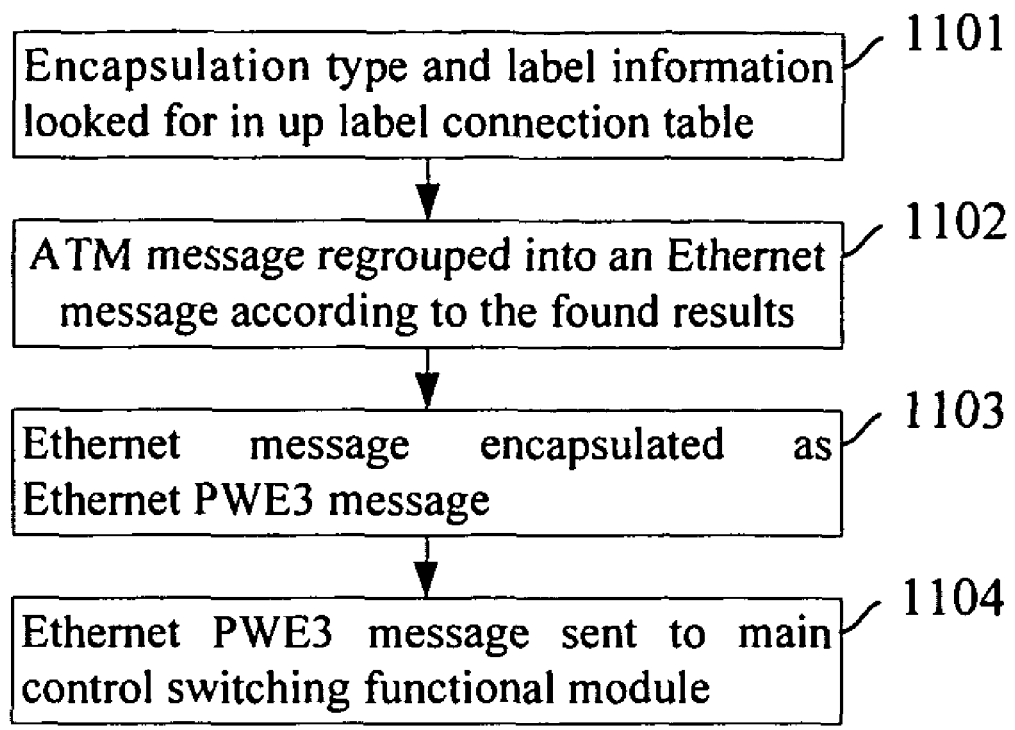
FIG. 11 is a flowchart illustrating the service transmission in the subscriber interface functional module during the PVC based access.

FIG. 11 is a flowchart illustrating the service transmission in the subscriber interface functional module, where the user terminal accesses the access device in the PVC mode and it is necessary for the subscriber interface functional module to regroup the message into an Ethernet message; as shown in FIG. 1, the detailed process is as follows:

Step 1101: searching, according to the PVC information in the ATM service message sent from the user terminal, for corresponding encapsulation type in the uplink label connection table and the label information to which the label connection is corresponding in the subscriber interface functional module.

Step 1102: regrouping the ATM message into an Ethernet message according to the information found.

Step 1103: encapsulating the Ethernet message into an Ethernet PWE3 message.

Step 1104: forwarding the Ethernet PWE3 message to the main control switching functional module.

The external layer label connection used herein between the subscriber interface functional module and the main control switching functional module is the internal label connection resources not visible by the outside. The connection configured in the access device is the connection from the user terminal's accessing PVC to LSP0/LSP2. This brings a much higher maintainability of the device.

EXAMPLE II an example with the VLAN ID as the FEC is taken for describing the configuration process of the label connection table and the service transmission process in the subscriber interface functional module.

Figure 12:
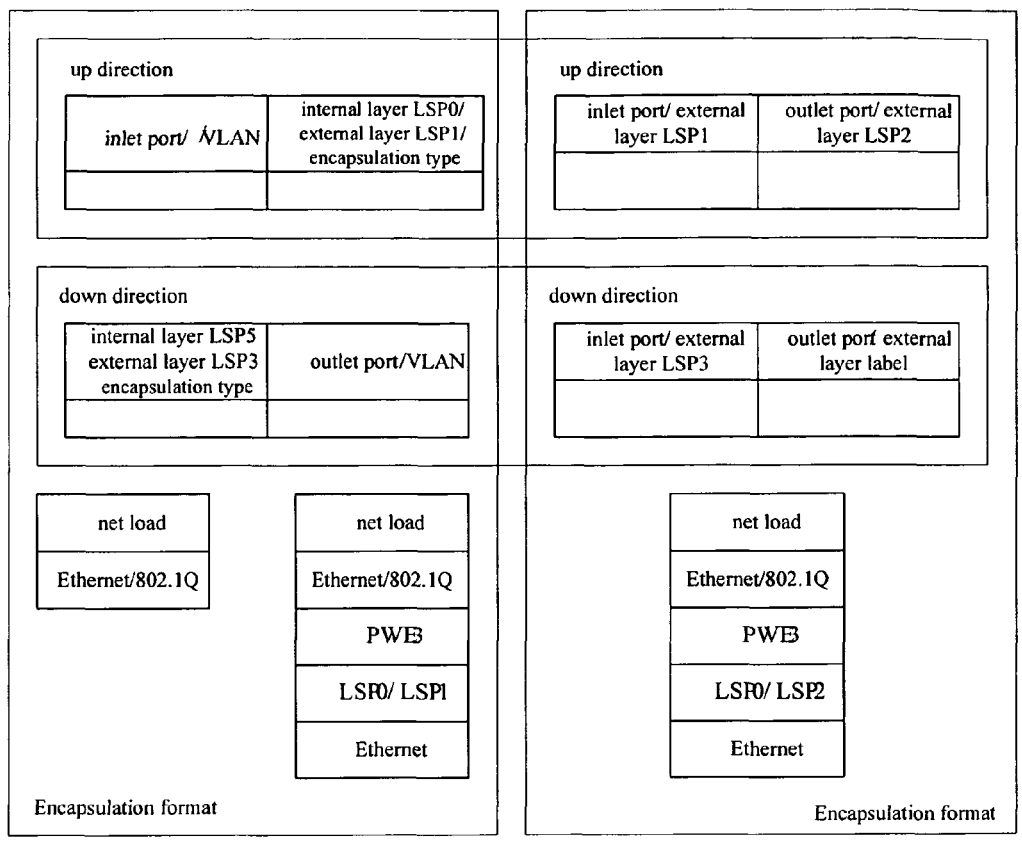
FIG. 12 is a schematic illustrating the label connection table and the format of a transmitted service message in the subscriber interface functional module during the VLAN based access.

When the user terminal accesses the access device in the VLAN mode, the label connection table in corresponding subscriber interface functional module and the format of the transferred service message are shown in FIG. 12. The VLAN access mode is primarily used in an Ethernet-format based network, such as an Ethernet, an Ethernet based Passive Optical Network (EPON), a Gigabit based Passive Optical Network (GPON) and etc.

As shown in FIG. 12, in the uplink direction, the service message sent from the user terminal is encapsulated with the ingress port information and VLAN ID information as well as internal layer label LSP0, external label LSP1 and encapsulation type information by the subscriber interface functional module, and then sent to the main control switching functional module. The main control switching functional module encapsulates the service message with the ingress port information and corresponding external layer label LSP1 as well as egress port information and corresponding external label LSP2, and sends it to the network side;

In the downlink direction, label switching is performed by the main switching functional module for the message sent from the network side, and the message is encapsulated with the ingress port information and corresponding external layer label LSP3 as well as egress port information and corresponding external layer label LSP4, i.e. the message is encapsulated with internal layer label LSP5, external layer label LSP3 and encapsulation type information as well as egress port information and VLAN ID information, and then sent to the subscriber interface functional module. After received by the subscriber interface functional module, the message is de-encapsulated and then sent to the user terminal.

The protocol stack used in the uplink direction and downlink direction, respectively, by each message is as shown in FIG. 12.

An Ethernet message accessing from an Ethernet port is encapsulated in line with the IETF Ethernet PWE3 standard based on the message's VLAN information or the port-specific VLAN information table configured by the access device itself, where the 802.1Q's VLAN information may be deleted or directly encapsulated in the message.

The external layer label connection used herein between the subscriber interface functional module and the main control functional module is the internal label connection resource not visible by the outside, and the connection configured in the access device is the connection between the user's accessing VLAN and LSP0/LSP2, which leads to a much higher maintainability of the device.

Figure 13:
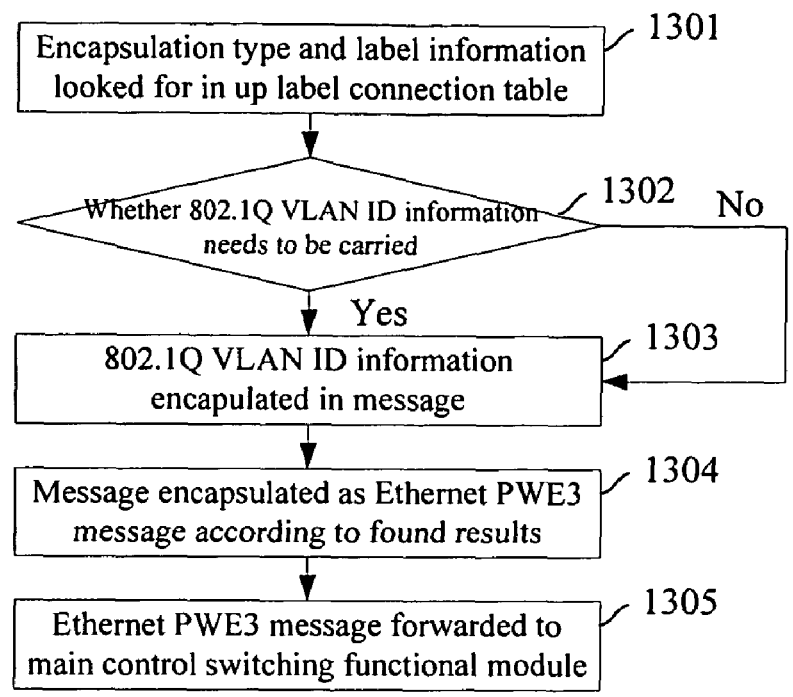
FIG. 13 is a flowchart illustrating the service transmission in the subscriber interface functional module during the VLAN based access.

FIG. 13 is a flowchart illustrating the service transmission of the subscriber interface functional module, where the user terminal accesses the access device in the VLAN mode and it is necessary for the subscriber interface functional module to regroup the message into an Ethernet message; as shown in FIG. 13, the detailed process is as follows:

Step 1301: searching corresponding encapsulation type and the label information to which the label connection is corresponding by the subscriber interface functional module in the uplink label connection table stored in itself according to the VLAN ID information and/or ingress port information in the service message sent from the user terminal.

Step 1302: judging whether it is necessary for the service message to carry the 802.1Q VLAN ID information by the subscriber interface functional module, if it is necessary, perform step 1403, otherwise perform step 1404.

Step 1303: encapsulating the 8021Q VLAN ID information in the message.

Step 1304: encapsulating the message into an Ethernet PWE3 message based on the result of the search.

Step 1305: forwarding the Ethernet PWE3 message to the main control switching functional module.

Figure 14:
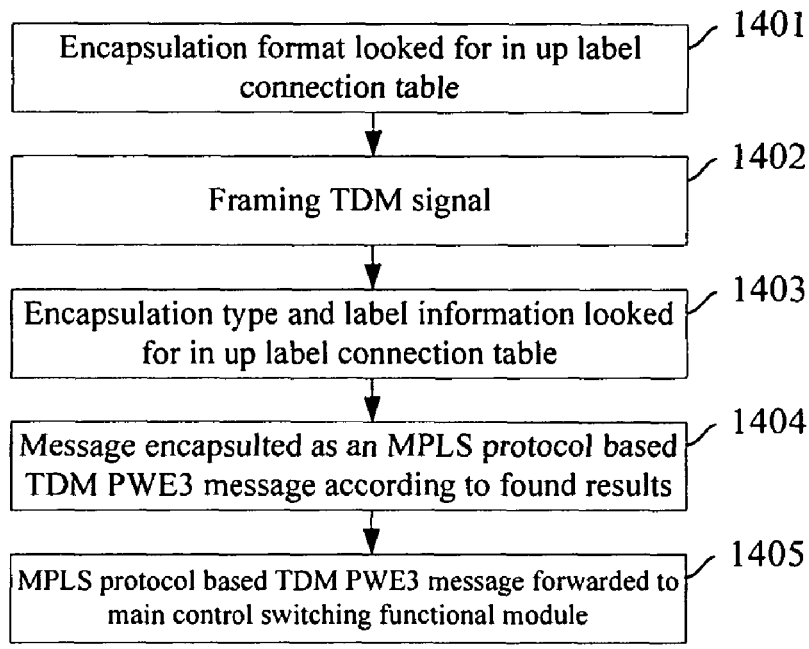
FIG. 14 is a flowchart illustrating the service transmission in the subscriber interface functional module during the TDM based access.

Apart from aforesaid access modes, the TDM mode may be used by the user terminal to access the access device. In this case, it is necessary to implement label encapsulation of the TDM message in the MPLS protocol network according to IETF defined TDM PWE3 standard. And it is also necessary for the access device to support the clock transfer modes, including such modes as a locking in network timing, a buffer-based storage timing recovery mechanism etc. Meanwhile during the service transmission of the subscriber interface functional module, it is necessary to add the TDM signal data message bearer process. As shown in FIG. 14, detailed process is as follows:

Step 1401: searching corresponding encapsulation format by the subscriber interface functional module in the uplink label connection table configured in itself according to the service bearer information in the service message sent from the user terminal.

Step 1402: framing the TDM signal in an ATM circuit emulation service (CES) mode, an AAL1 (ATM adaptation layer) mode, or AAL5 mode, or HDLC mode after sampling and encoding.

Step 1403: searching corresponding encapsulation type and label information to which the label connection is corresponding by the subscriber interface functional module in the uplink label connection table stored in itself.

Step 1404: encapsulating the message into an MPLS protocol based TDM (TDM over MPLS) PWE3 message on the basis of the searching result.

Step 1405: forwarding the MPLS protocol based TDM PWE3 message to the main control switching functional module.

The embodiments given in FIG. 10-14 are used for service transmission using the MPLS based label connection between the subscriber interface functional module and the main control switching functional module, where the major label connection set-up procedure is realized in the subscriber interface functional module while the main control switching functional module performs only the label switching. In the case that the MPLS based label connection is used for service transmission only between the main control switching functional module and network side while the traditional mode is still used for the transmission in the subscriber interface functional module, the service transmission process in the main control switching functional module is similar to that in the subscriber interface functional module as shown in FIGS. 10-14.

For a more detailed description of the embodiments of the present invention, FIGS. 15-19 show application scenes of the access device provided by the embodiments of the present invention. In FIGS. 15-19, the thickest solid connection line indicates that the connection is an MPLS link; the second thickest solid connection line indicates a copper cable connection; the thinnest solid connection line and the dot line indicate an optical fiber connection.

Figure 15:
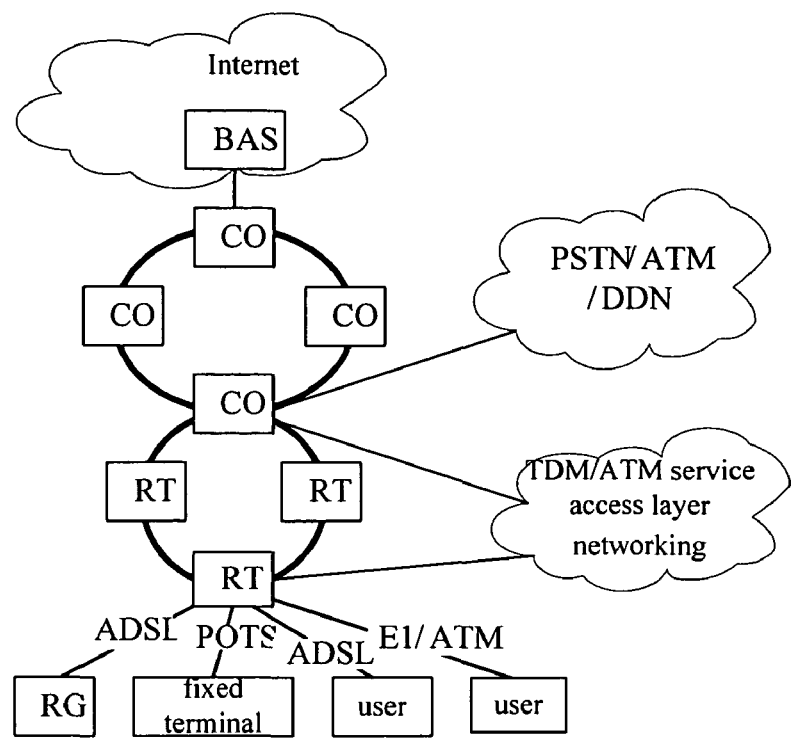
FIG. 15 is a schematic illustrating the networking of an access layer MPLS for an IP service according to an embodiment of the present invention.
Figure 16:
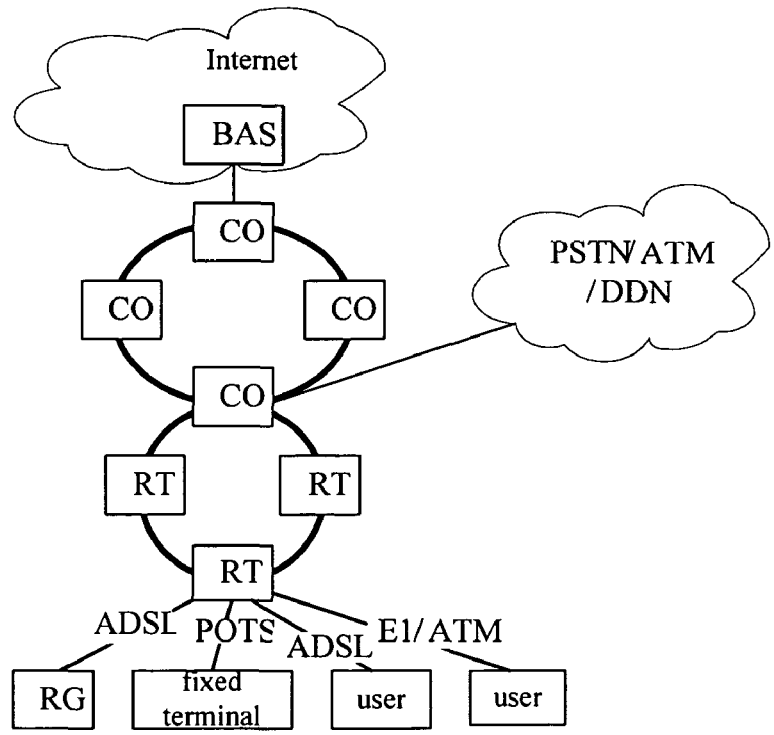
FIG. 16 is a schematic illustrating the networking of an access layer MPLS for an integrated service according to an embodiment of the present invention.

Application scenes of the access device provided by the embodiments of the present invention include two categories: the networking of access layer for IP services and that for integrated services, which are shown in FIGS. 15 and 16, respectively, where CO represents a physical position where a Local Exchange (LE) is located; RT represents a remote end access device under the LE; RG represents a home-use gateway; and POTS represents the plain old telephone service.

As shown in FIG. 15, an IP service is transmitted via the MPLS protocol networking, i.e. the IP based service uses the MPLS network as the bearer to ensure the IP network's Tripleplay service, IP service's QoS and reliability, whereas the ATM and the TDM traditional services still access the LE via other non-MPLS protocol access networks and are sent to different core networks, respectively.

As shown in FIG. 16, apart from the IP services, such services as the ATM, the TDM services etc are also loaded in the MPLS protocol via PWE3 so that it is only necessary to keep the MPLS protocol access network, and the MPLS protocol access network completes the bearer of integrated services.

Figure 17:
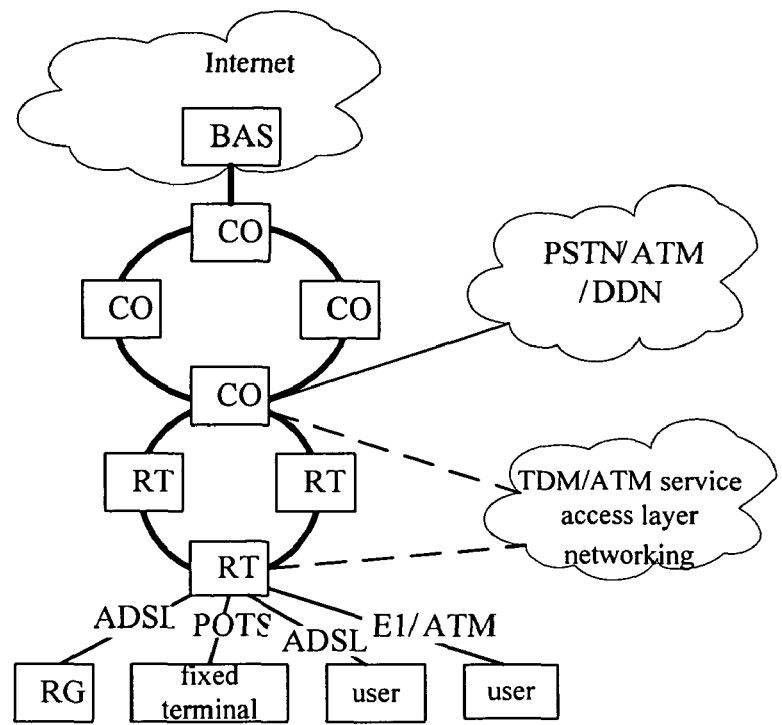
FIG. 17 is an application schematic illustrating how to use the MPLS label for identifying the access layer user and the service.

Another application scene is shown in FIG. 17, where not only the MPLS is used to complete the service layer networking, but MPLS labels are used as a means for the broadband access server (BAS) to identify the access layer user and service so as to overcome the shortcomings of a VLAN Label in identifying the user and service, which provides a higher flexibility in use.

Figure 18:
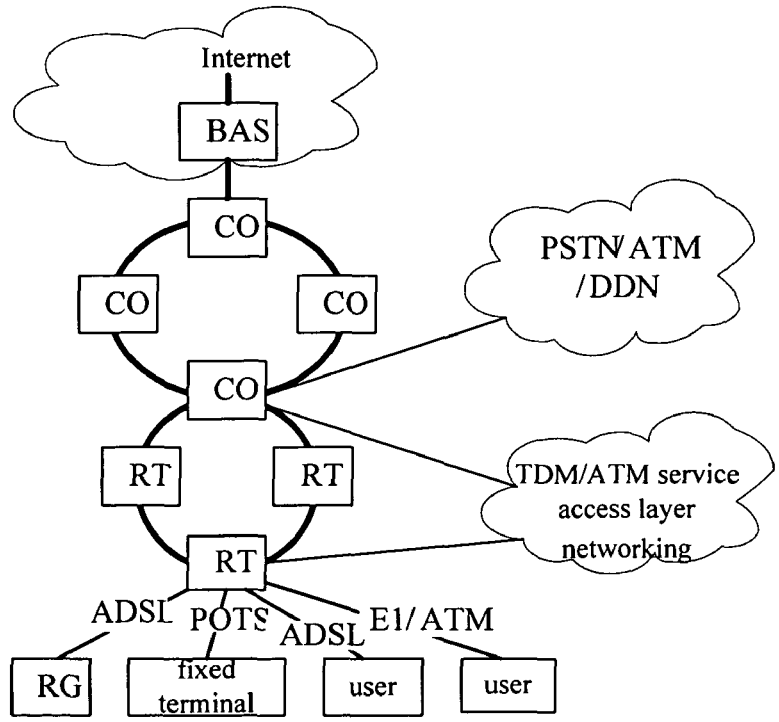
FIG. 18 is a schematic illustrating the networking of the connection of the entire network for an IP service according to an embodiment of the present invention.
Figure 19:
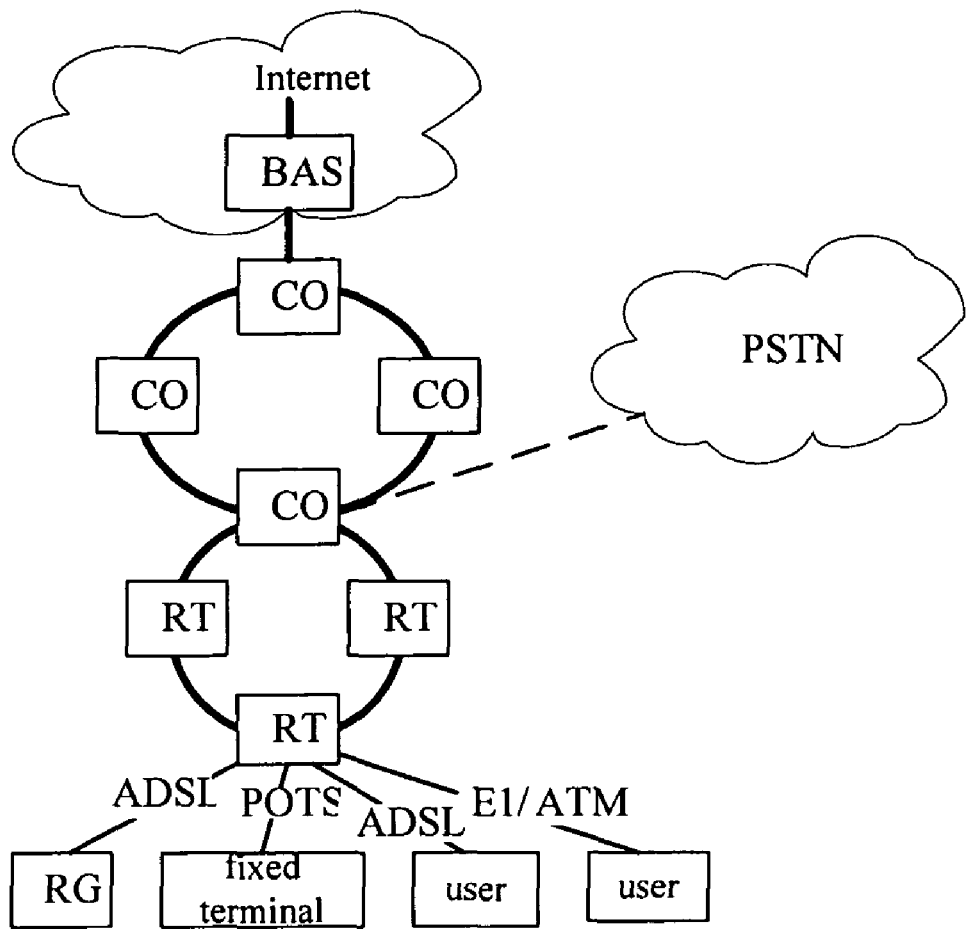
FIG. 19 is a schematic illustrating the networking of the connection of the entire network for an integrated service according to an embodiment of the present invention.

There is also an application mode of the embodiment of the present invention in which MPLS connections are used globally in the entire network, including specifically, a global MPLS connection for IP services and a global MPLS connection for integrated services, which are shown in FIGS. 18 and 19, respectively.

As shown in FIG. 18, Ethernet pseudo wires could be set up across the BAS or core network edge router to the peer end operator's edge device (PE) through the core network for such IP services as a session-type, a virtual private network (VPN), a private line (PL) and other services across the BAS or core network edge router's tunnel so as to realize global MPLS connection. In this way, the advantages of the MPLS may be better made use to ensure QOS, safety and survivability.

In the scene shown in FIG. 19, not only a PE-PE global connection could be established for an IP service, but the statically configured TDM and ATM PL could be moved globally into the IP network via the PWE3 standard without keeping the ATM and DDN networks. For the call-based voice service, it is still necessary to keep a Public Switched Telephone Network (PSTN) core network. After the voice is packetized, i.e. adopting the NGN solution, when the IP is used as the bearer of the voice service, it will be no longer necessary to keep the PSTN core network, thus the IP network becomes a uniform bearer platform for the whole network.

Aforesaid descriptions are only embodiments of the process and method according to the invention and are not used for limiting this invention. Any modification, equivalent alteration, and improvement within the scope of the spirit and principle of this invention should fall in the protection scope of this invention.

What is claimed is:

1. An access device, comprising:
    a subscriber interface functional module;
    a main control switching functional module; and
    a Multi-Protocol Label Switching (MPLS) connection management functional module for establishing a label connection needed for a service transmission of the access device and for using, controlling, and releasing the label connection during the service transmission, wherein the MPLS connection management functional module comprises:
    an internal MPLS connection resource management module configured to manage internal connection resources between the subscriber interface functional module and the main control switching functional module, wherein the internal MPLS connection resource management module is configured in the main control switching functional module;
    an MPLS control management module configured to establish an internal label connection between the subscriber interface functional module and the main control switching functional module according to internal connection resource information sent from the internal MPLS connection resource management module, and establish an external label connection between the access device and a network side; and
    an MPLS service processing module configured to map a service sent from a user terminal to the internal label connection when the service is transmitted to the subscriber interface functional module, and perform a label switching process between the internal label connection and the external label connection when the service mapped to the internal label connection is transmitted to the main control switching functional module,
    wherein the internal label connection and the external label connection are both MPLS connections; and
    wherein the internal MPLS connection resource management module and the MPLS control management module are configured in the main control switching functional module of the access device, and a distributed MPLS connection configuration module and a distributed MPLS service processing module are configured distributedly in the subscriber interface functional module, wherein:
- the distributed MPLS connection configuration module is configured for sending the label connection established by the MPLS control management module down to the distributed MPLS service processing module in the subscriber interface functional module; and
- the distributed MPLS service processing module is configured for mapping the service sent from the user terminal to the label connection, wherein the label connection is sent from the distributed MPLS connection configuration module for transmission, and de-encapsulating the label connection based service sent from the network side.

2. The access device according to claim 1, wherein the MPLS control management module is further configured to send a control instruction for using and controlling the label connection during a transmission of the service, and sending another control instruction for releasing the label connection when the service transmission is over; and
the MPLS service processing module is further configured to de-encapsulate the label connection based service sent from the network side.

3. The access device according to claim 1, further comprising:
a clock system module for providing a reference timing for the whole access device, outputting the reference timing from a clock module of the main control switching functional module of the access device to each clock module of the access device.

4. The access device according to claim 1, wherein the internal label connection and the external label connection each comprise a single layer MPLS Label Switched Path (LSP) connection, an MPLS LSP stack connection, pseudo wires edge-to-edge emulation (PWE3) encapsulation information loaded on the corresponding MPLS label connection and attribute information related with the label connection.

5. The access device according to claim 1, wherein the MPLS connection management functional module is configured in the subscriber interface functional module and the main control switching functional module of the access device, or independently configured outside of the subscriber interface functional module and the main control switching functional module.

6. The access device according to claim 1, wherein the access device further comprises:
a line interface module for matching the service sent from other interfaces to the interface of the subscriber interface functional module, and sending the matched service to a data service processing module; and
the data service processing module for adapting the service sent by the line interface module from a non-MPLS protocol bearer architecture to an MPLS protocol bearer architecture corresponding to the internal label connection, and sending the adapted service to the main control switching functional module.

7. The access device according to claim 1, wherein the access device is a broadband access device.

8. A service transmission method used in an access device comprising a subscriber interface functional module and a main control switching functional module, comprising:
establishing in the access device an external label connection between the access device and a network side;
selecting, by the subscriber interface functional module, an internal label connection for a service sent from a user terminal according to internal connection resource information sent from an internal MPLS connection resource management module in the main control switching functional module, wherein the internal label connection and the external label connection are both MPLS connections;
mapping, by the subscriber interface functional module, the service to the selected internal label connection, and sending the service mapped to the internal label connection to the main control switching functional module;
mapping, by the main control switching functional module, the service mapped to the internal label connection to the established external label connection; and
sending, by the main control switching functional module, the service mapped to the external label connection to the network side,
wherein before the step of establishing, in the access device, the external label connection between the access device and the network side, the method further comprises:
configuring an interface attribute and an interface type in the access device, and binding the interface attribute, the interface type and a remote end device IP address, and starting to establish the external label connection; and
after the external label connection has been established, configuring a corresponding label switching table in the main control switching functional module, and configuring, in the subscriber interface functional module, a label connection table according to the label switching table sent from the main control switching functional module.

9. The method according to claim 8, further including the step of selecting a corresponding internal label connection for the service in an uplink label connection table according to at least one of the service bearer information and service type comprised in the service, wherein an outmost layer label of the internal label connection is configured as an internal label of the access device.

10. The method according to claim 9, wherein the step of mapping the service to the established external label connection comprises:
receiving, by the main control switching functional module, the service mapped to the internal label connection sent by the subscriber interface functional module; and
performing, by the main control switching functional module, a label switching process to the outmost layer label wherein the outmost layer label after switching the external label between the access device and the network side.

11. The method according to claim 10, wherein the step of performing a label switching process to the outmost layer label comprises:
searching, by the main control switching functional module, according to service bearer information, a corresponding label in an outmost layer label crosstab; and
switching the outmost layer label of the service according to the searched label.

12. The method according to claim 8, further comprising:
de-encapsulating a service based on the MPLS protocol after the main control switching functional module receives the service sent from the network side, and sending the de-encapsulated service to the subscriber interface functional module.

13. The method according to claim 8, further comprising:
performing a label switching on an outmost layer label of a service after the main control switching functional module receives the service from the network side, and sending the service after the label switching to the subscriber interface functional module;

after the service is received by the subscriber interface functional module, de-encapsulating the service based on the MPLS protocol and sending the de-encapsulated service to the user terminal.

14. An access device, comprising:

a processor configured to implement a method comprising:

establishing an internal label connection between inner functional modules of the access device according to internal connection resource information sent by an internal MPLS connection resource management module configured in one of the inner functional modules, wherein the internal MPLS connection resource management module is configured to manage internal connection resources between the inner functional modules;

establishing an external label connection between the access device and a network side;

mapping a service sent from a user terminal to the internal label connection; and performing a label switching process between the internal label connection and the external label connection, wherein the internal label connection and the external label connection are both MPLS connections;

wherein the method further comprises: providing an uplink label connection table and an outmost layer label crosstab;

wherein the internal label connection is established by choosing a corresponding internal label connection in the uplink label connection table for the service and whereby an outmost layer label of the service is configured as an internal label of the access device; and wherein the external label connection is established by searching a corresponding label in the outmost layer label crosstab and switching the outmost layer label of the service.

* * * * *